United States Patent
Rivera et al.

[11] Patent Number: 6,056,786
[45] Date of Patent: May 2, 2000

[54] TECHNIQUE FOR MONITORING FOR LICENSE COMPLIANCE FOR CLIENT-SERVER SOFTWARE

[75] Inventors: Angel Rivera, Cary; Samuel Anthony Ruby, Raleigh, both of N.C.

[73] Assignee: International Business Machines Corp., Armonk, N.Y.

[21] Appl. No.: 08/893,493

[22] Filed: Jul. 11, 1997

[51] Int. Cl.[7] ................................................. G06F 17/30
[52] U.S. Cl. .......................................... 795/712; 709/229
[58] Field of Search .............................. 395/712; 709/229

[56] References Cited

U.S. PATENT DOCUMENTS

| | | | |
|---|---|---|---|
| 5,023,907 | 6/1991 | Johnson et al. | 380/4 |
| 5,499,340 | 3/1996 | Barritz | 714/47 |
| 5,579,222 | 11/1996 | Bains et al. | 395/712 |
| 5,752,041 | 5/1998 | Fosdick | 395/712 |
| 5,754,763 | 5/1998 | Bereiter | 713/201 |

*Primary Examiner*—Jack M. Choules
*Attorney, Agent, or Firm*—Gregory M. Doudnikoff

[57] ABSTRACT

A technique for determining the number of users or client computers which transact with a server program during a given period of time. The technique is used to ensure that more users or client computers are not transacting with the server program than operative program licenses allow. The technique is embodied in a license management routine that reads and parses data entries in the server program's audit log to determine the number of users or client computers transacting with the server program over a time period. Client-server computing environments that record transactions in an audit log can employ this technique to monitor server program usage and to ensure that the appropriate number of client program licenses are obtained.

12 Claims, 6 Drawing Sheets

13948, UserView, SUCCESS, 1997/06/23, 07:36:27, 07:36:27, tco
cto, tcocto, carcps22.raleigh.ibm.com, 12946, Report, SUCCESS, 1997/06/23, 07:37:23, 07:37:26, jeri,
jeri, jeri2.raleigh.ibm.com, Users, dropDate is null
order by login 13268, UserView, SUCCESS, 1997/06/23, 07:37:27, 07:37:27, tco
cto, tcocto, carcps22.raleigh.ibm.com, 13720, Report, SUCCESS, 1997/06/23, 07:37:46, 07:37:46, jeri,
jeri, jeri2.raleigh.ibm.com, Users, login in ( ' jeri ' )

13462, UserModify, SUCCESS, 1997/06/23, 07:38:00, 07:38:01, j
eri, jeri, jeri2.raleigh.ibm.com, jeri 82 { 13948, Report, SUCCESS, 1997/06/23, 07:38:04, 07:38:06, jeri,
jeri, jeri2.raleigh.ibm.com, Users, dropDate is null
order by login (84, 86, 88)

13720, UserView, SUCCESS, 1997/06/23, 07:39:28, 07:39:29, tco
cto, tcocto, carcps22.raleigh.ibm.com, 13268, Report, SUCCESS, 1997/06/23, 07:39:12, 07:39:38, jeri,
jeri, jeri2.raleigh.ibm.com, FeatureView, originlogin in
( ' jeri ' ) order by addDate 13948, FeatureView, SUCCESS, 1997/06/23, 07:39:53, 07:39:57,
jeri, jeri, jeri2.raleigh.ibm.com, 13591

13462, Report, SUCCESS, 1997/06/23, 07:39:51, 07:39:58, smazz
ara, smazzara, smazzara.raleigh.ibm.com, WorkareaView, user
Login in ( 'smazzara' )

12430, WorkAreaCreate, SUCCESS, 1997/06/23, 07:40:25, 07:40:
32, smazzara, smazzara, smazzara.raleigh.ibm.com, admin01, t
cid30

TECHNIQUE FOR MONITORING FOR LICENSE COMPLIANCE FOR CLIENT-SERVER SOFTWARE

BACKGROUND OF THE INVENTION

1. Field of the Invention

The present invention relates to a technique for determining the number of users or client computers which submit transactions to a server program within a specified period of time. More particularly, the present invention relates to a technique for determining whether the number of users or client computers transacting with a server program exceeds the number of licenses issued for the users or client computers. The present invention offers an alternative to existing license management systems for client-server computing environments.

2. Description of the Related Art

Client-server computing environments have become increasingly popular. Typically, these environments are computers networked together which execute a software program which has code resident and executed on both a server computer and one or more client computers. In an attempt to increase productivity, some code (server program) for a software program is stored at a relatively powerful server computer, and other code (client program) for the software program which enables access to the server program is stored at each of multiple client computers. The client computers access the server over a network of some known configuration. Software manufacturers typically license a client-server program so that the customer gets a single server license and a set number of client licenses.

The server license permits the customer/licensee to use the server program on a single server computer and the client licenses permit the customer to use the client program on a certain number of client computers. The customer must purchase a separate license for each computer onto which the client program is installed or may install the client program on a larger number of client computers, but may have only a given number of clients active at a given time. This is dependent on the manufacturer's licensing terms. Thus, a customer who purchases ten licenses for the client program may install the client program on ten computers (or may only have ten clients active at a time) depending on the manufacturer's licensing scheme.

For manufacturers of client-server software, one problem that exists is ensuring that customers comply with the terms of the program licenses and purchase enough licenses to cover the number of computers onto which the client program is installed or on which the client program is active at a given time. Software manufacturers lose billions of dollars each year to software piracy, both intentional and unintentional.

Ongoing licensees of client-server software often find it difficult to determine whether they are complying with the terms of program licenses (are not using more than the permitted number of licenses) or whether they have an excess number of client licenses. Many licensees want to comply, and will purchase any needed additional client licenses if they can easily determine how many licenses they need. On the other hand, the licensees might have too many client licenses. Typically, software is "upgraded" by the manufacturer every year or two. If the licensees had a technique for easily determining the number of client licenses they actually need, they could "upgrade" only the number of client licenses they actually need, rather than the number they previously had. Upgrading only the client licenses they actually need can result in significant cost savings. But determining this number has been difficult.

Software manufacturers have dealt with their problem by devising license management systems to limit the number of client computers that can concurrently transact with the server to the number of licenses purchased for the client program. Such a licensing management system is described in Japanese Patent Application Serial Number JP 8241281 entitled "License management system for client server system—includes utilization permission analysis module to manage demand module and utilization permission information table," which was filed on Sep. 1, 1996 and is assigned to NEC Corp. The licensing management system described in this application includes a server that validates the function of an execution management module which performs processing in response to a down-load demand of a program. Both server and client sides have tables which provide utilization permission information, which the license management system uses to prevent unauthorized use of a license.

Though this and other existing license management systems effectively limit the number of client computers that can transact with the server, use of these license management systems introduces new problems.

License management systems typically use a license server to monitor connections to the server. One problem they introduce is that if the license server is not available or not operating properly, no client programs can transact with the server program. Another problem is that requiring client computers to request a license from the license server before interacting with the server program causes performance degradation.

Still another problem with a license management system is that if the network on which a product runs is reconfigured, a customer must disconnect all client computers transacting with the server program and update all the files related to the license management system. Thus, a product that uses a license management system can be hard to maintain and, when maintenance is required, can mean client users are prevented from running the product.

Accordingly, a need exists for a technique for determining the number of client computers transacting with a server to help ensure that customers comply with the terms of product licenses, but such a technique should not cause performance degradation or require excessive maintenance.

SUMMARY OF THE INVENTION

An object of the invention is to provide a simplified and non-invasive technique for determining how many users or client computers are transacting with a server program during a given time period.

Another object is to determine how many users or client computers are transacting with the server program without preventing client computers from properly accessing the server program.

Still another object is to determine how many users or client computers are transacting with the server program without experiencing a degradation in performance.

Yet another object is to help ensure that more users or client computers are not transacting with the server program than the terms of product licenses allow.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides computer readable code stored on media for determining client usage in a client-server computing environment having a server program and at least one client program, comprising first subprocesses for establishing a time period for which to review an audit log for transaction entries; second subprocesses for locating a first transaction entry recorded in the audit log for the time period and reading the first transaction entry; third subprocesses for determining whether the first transaction entry represents usage of the server program by a unique client not already counted, and, if so, counting the first transaction entry; and fourth subprocesses for repeating the second and third subprocesses for each remaining transaction entry recorded in the audit log for the time period. The code may further comprise fifth subprocesses for determining whether the number of counted transaction entries is greater than a number of client licenses that a licensee has obtained for the client programs. The first subprocesses may further divide the time period into time intervals, the second subprocesses may further determine the time interval during which each of the transaction entries was recorded, and the third subprocesses may determine whether each of the transaction entries represents a unique client during the time interval during which the transaction entry was recorded, and if so, count the transaction entry relative to the time interval during which the transaction entry was recorded. Additionally, the code may further comprise sixth subprocesses for generating a report regarding client usage during the time period, and eighth subprocesses for alerting an administrator of the client server computing environment that client usage is not in compliance with license terms if the number of counted transaction entries is determined to exceed the number of client licenses. The code may further comprise ninth subprocesses for alerting a software manufacturer of the client-server program that the licensee is not in conformance with license terms if the fifth subprocesses determines that the number of counted transaction entries is greater than the number of client licenses and tenth subprocesses for determining whether the licensee has come into compliance with the license terms after passage of a predetermined amount of time, and, if not, preventing the server program from performing any additional client transactions until compliance has been achieved.

The present invention also provides, in a client-server computer environment including a server program operating on a server computer and a plurality of associated client programs operating on client computers, a method for determining whether a licensee of the client programs is in conformance with license terms regarding client program usage, comprising the steps of establishing a time period for which to review an audit log in which entries regarding client program transactions with the server program are recorded; determining which entry in the audit log was the first entry which occurred in the time period; reading the first entry; determining whether the read entry represents usage of the server program by a unique client not already counted, and if so, counting the read entry; and repeating the reading and second determining steps for each remaining entry recorded for the time period. The method may further comprise the step of determining whether the number of counted entries is greater than a number of client licenses. The establishing step may further divide the time period into time intervals, the reading step may further determine the time interval during which the read transaction occurred, and the second determining step may further determine whether the read transaction entry represents a unique usage during the time interval during which the transaction entry occurred, and if so, count the transaction entry relative to the time interval during which the transaction entry occurred.

The present invention also provides a system for determining a number of clients transacting with a server program in a client-server computing environment, the system comprising means for establishing first time period for which to review a log of transaction entries for client transactions with the server program; means for locating an earliest transaction entry in the log which occurred during the time period; means for reading the located transaction entry and determining whether the earliest transaction entry represents a usage of the server program by a unique client which has not already been counted, and, if so, counting the located transaction entry; and means locating each subsequent transaction entry which occurred during the time period and for repeating the reading and determining means relative to each said subsequent transaction entry. The reading means may further comprise recording a user identification and client computer identification combination in a file for each transaction entry which represents a unique client which has not been counted and comparing the user identification and client computer identification combination to those already recorded in the file to determine whether the located transaction entry has been counted. The system may further comprise means for determining whether the number of counted transactions entries is greater than a number of client licenses for the client server computing environment.

The present invention will now be described with reference to the following drawings, in which like reference numbers denote the same element throughout.

DESCRIPTION OF THE PREFERRED EMBODIMENT

Figure 1:
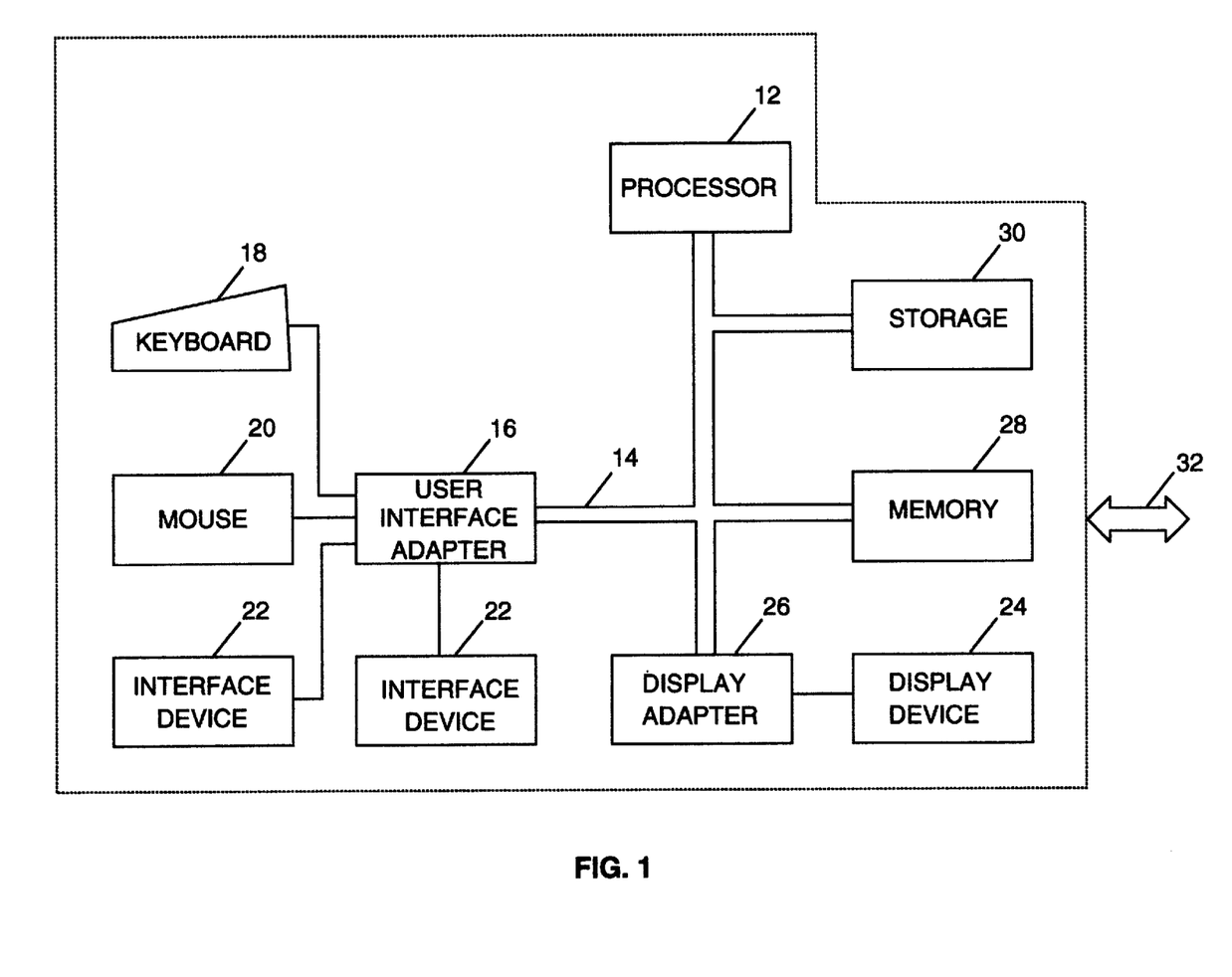
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 1, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adaptor 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
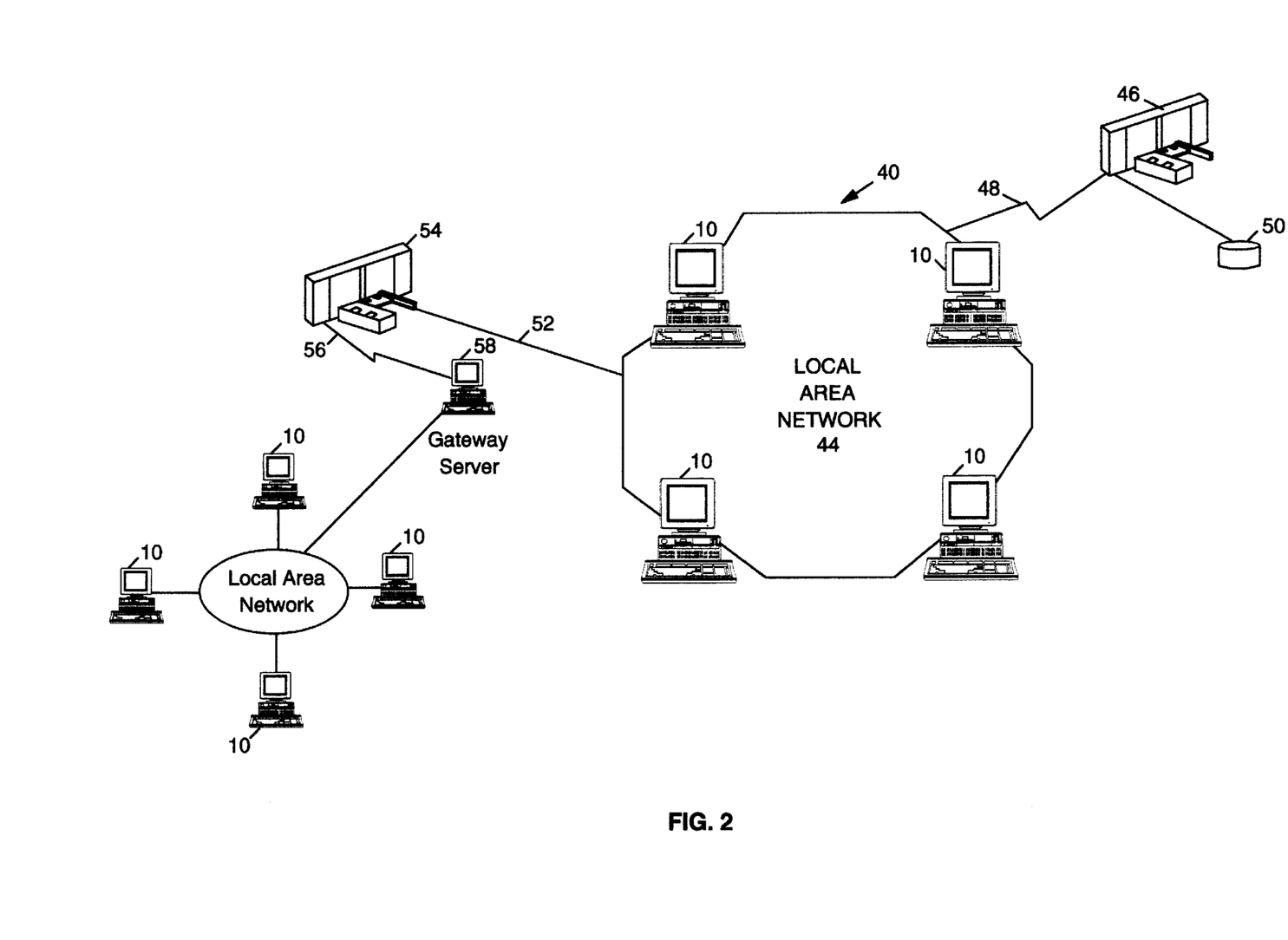
FIG. 2 illustrates a data processing network in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application Systen/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long term storage media of some type, such as a CD-ROM drive or hard drive, which is represented by the permanent storage 30 of the workstation 10. In a client-server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software programming code on physical media and/or distributing software code via networks are well known and will not be further discussed herein.

The preferred embodiment of the present invention will now be discussed with reference to FIGS. 3 through 5.

Figure 3:
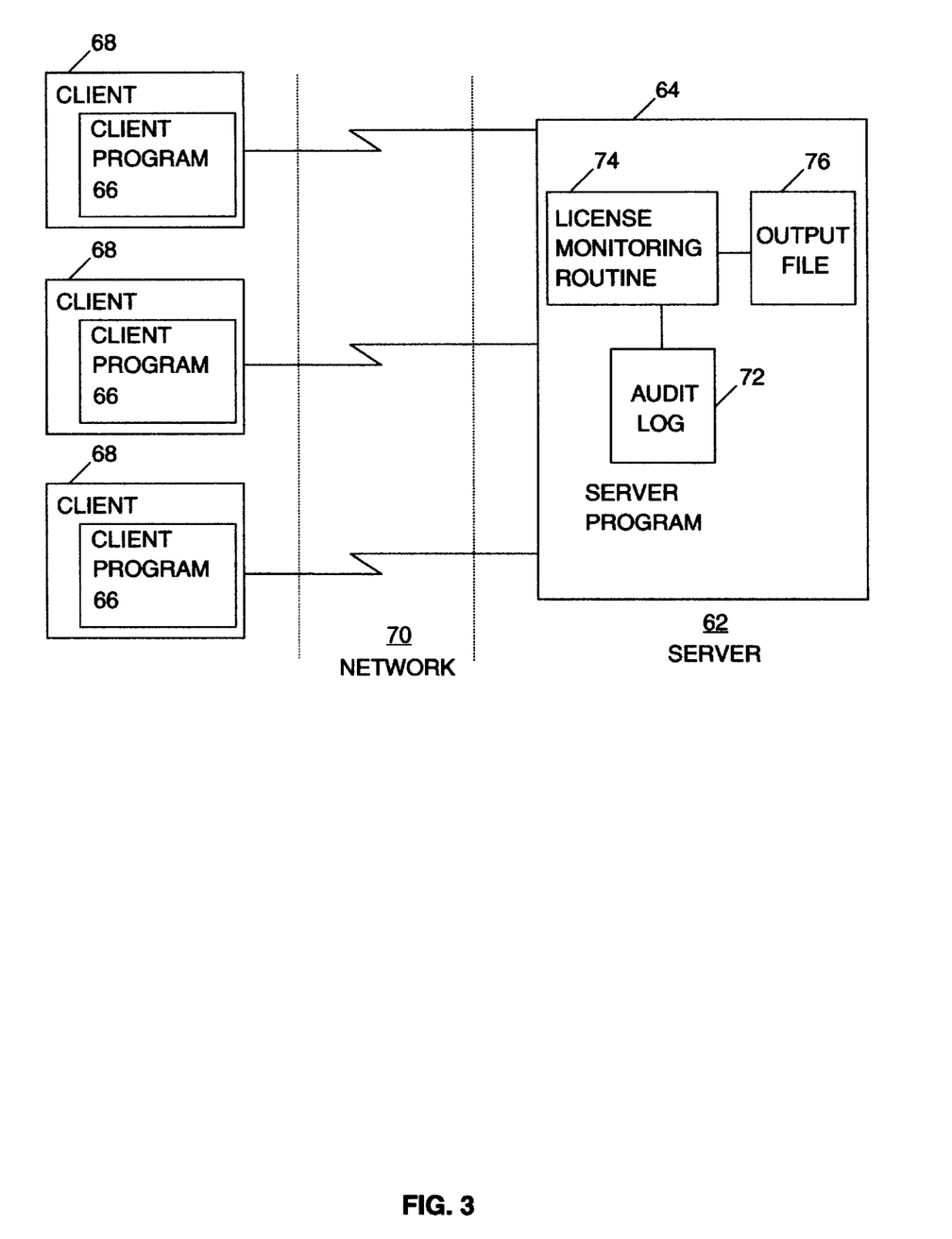
FIG. 3 graphically illustrates a typical client-server computing environment according to the present invention.

FIG. 3 illustrates a typical client-server computing environment 60 in which a server program 64 is resident on a server computer 62. A number of client programs 66 associated with the server program 64 are resident and execute on respective client computers 68. The client programs 66 communicate with the server program 64 through known techniques over a network 70 of a known configuration.

In the typical client-server computing environment, the server program 64 records information for each transaction between the server program 64 and the client programs 68 as an entry in an audit or transaction log 72. Each transaction recorded in the audit log 72 contains transaction information such as the date and start and end times of the transaction, the name or identifier of the user, the name or identifier of the client computer on which the client program 66 is executing, and the nature of the transaction. The audit log 72 can be stored in an internal data base of the server program 64 or in an external database associated with and accessible by the server program 74.

Figure 4:
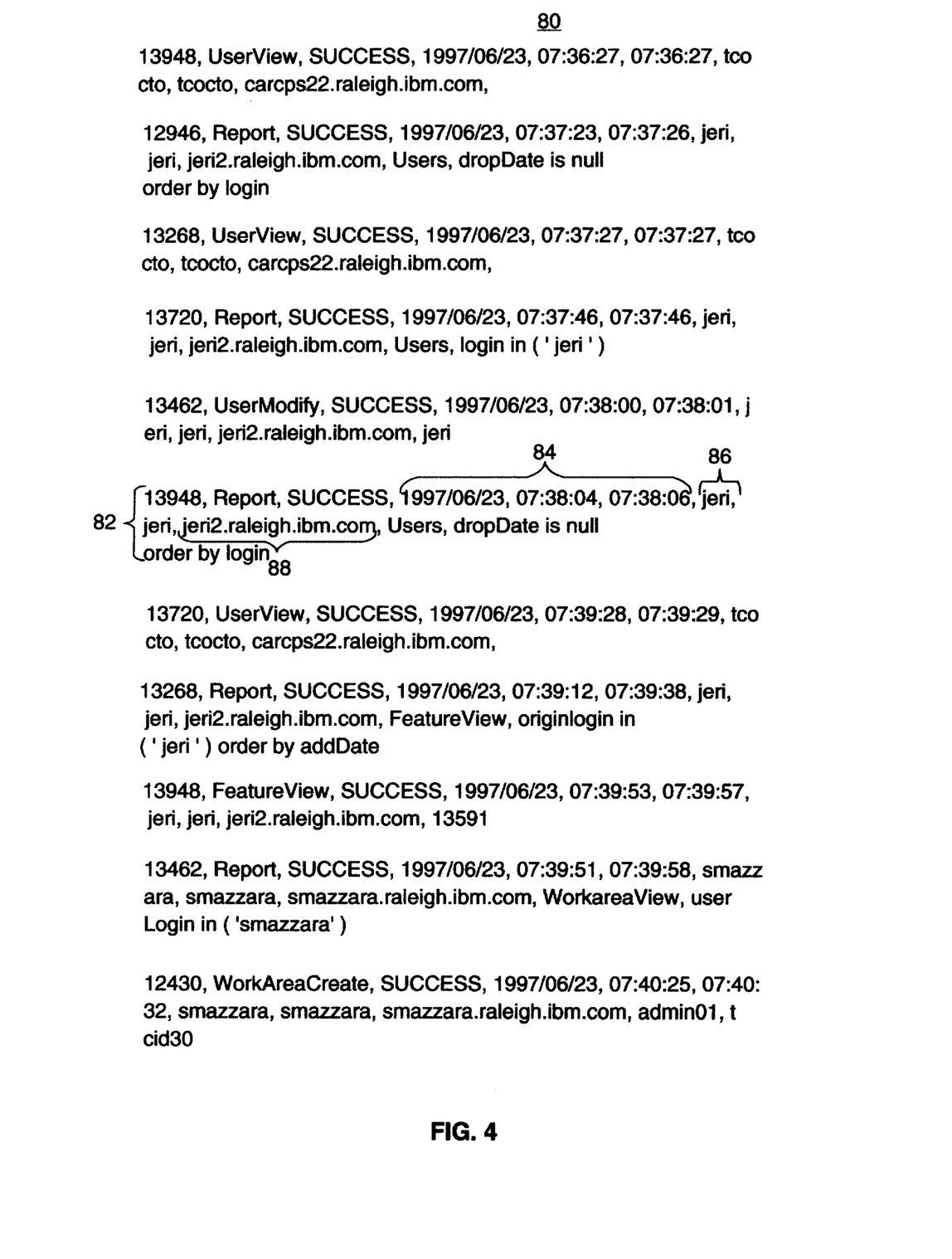
FIG. 4 illustrates a portion of a typical audit log listing transactions between a server program and several client computers.

FIG. 4 illustrates a portion of a typical audit log 80. The present invention utilizes certain data contained in a typical audit log to determine license compliance. An entry 82 in the audit log 80 includes a timestamp 84 comprised of the date and start and end times of the transaction in a form such as "1997/06/23, 07:38:04, 97:38:06". The entry 80 also identifies the name of the user or user ID 86 and the name of the client computer or client ID 88 from which the transaction was initiated. In the entry 80, the user ID 86 is "jeri" and the client ID 88 is "jeri2@raleigh.ibm.com". In a typical client-server computing environment, each user and each client computer have an identifier assigned to them that is unique within the network. In this case, the identifiers have the form "user_name" for the user ID and "computer_name@network_name" for the client computer ID. Entries are recorded sequentially in the sample audit log 80 based upon the time the transaction was completed.

The present invention utilizes the audit log to determine the number of unique client entities that initiated transactions with the server program during a particular time interval. This approach is most useful if the licensing arrangement is based on a total number of concurrent users. The invention can easily be modified to determine the number of unique client computers transacting with the server program, if the terms of operative program licenses limit the number of client computers rather than the number of concurrent users. The present invention counts the number of users transacting with the server program by reviewing the audit log entries for a number of time intervals during a time period. The present invention uses the results to determine whether the licensee has purchased a sufficient number of licenses to cover the number of users transacting with the server program.

Figure 5A:
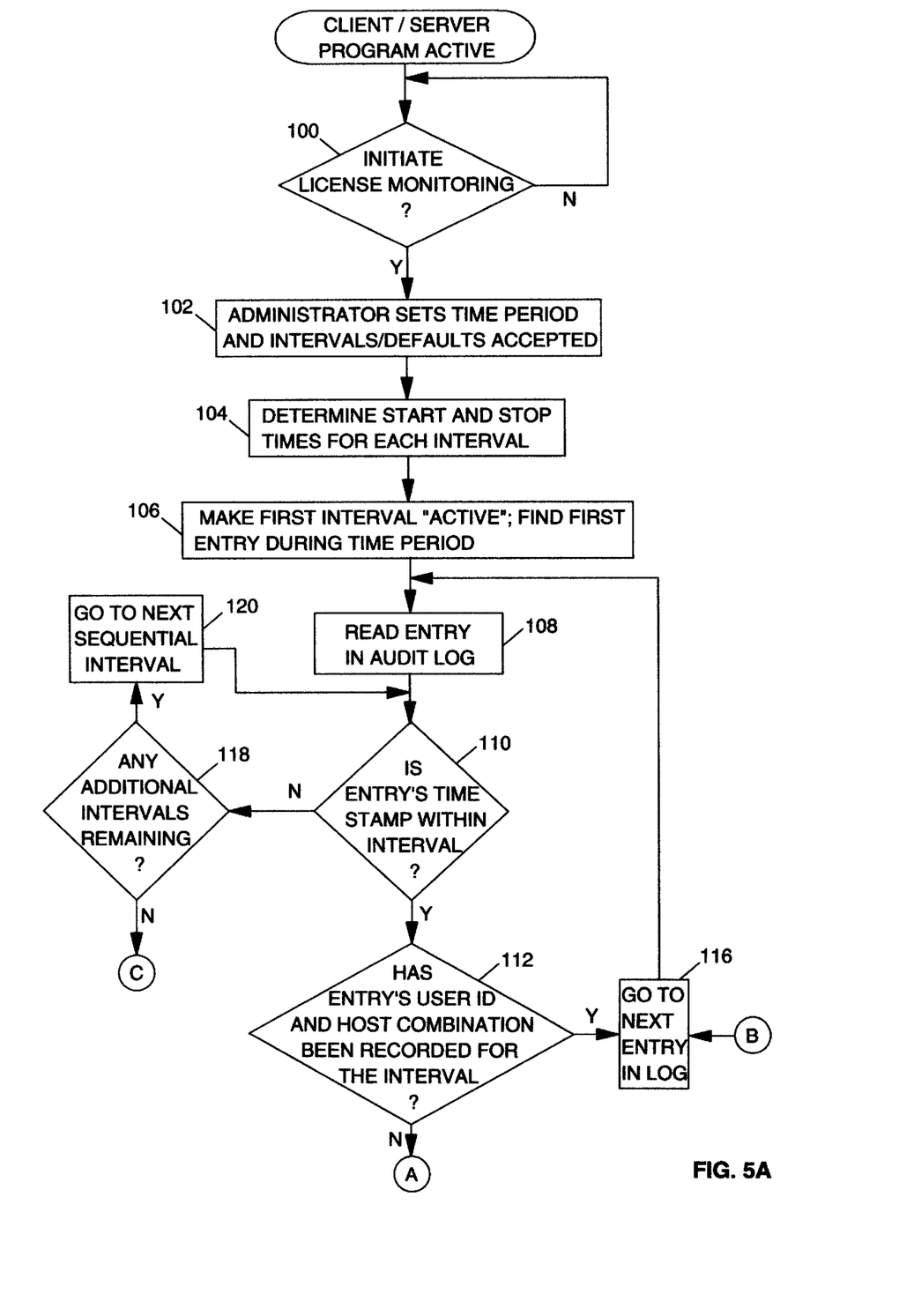
FIGS. 5A–5B illustrate a flow chart which sets forth the logic involved with determining the number of users or client computers transacting with a server program in accordance with the present invention.
Figure 5B:
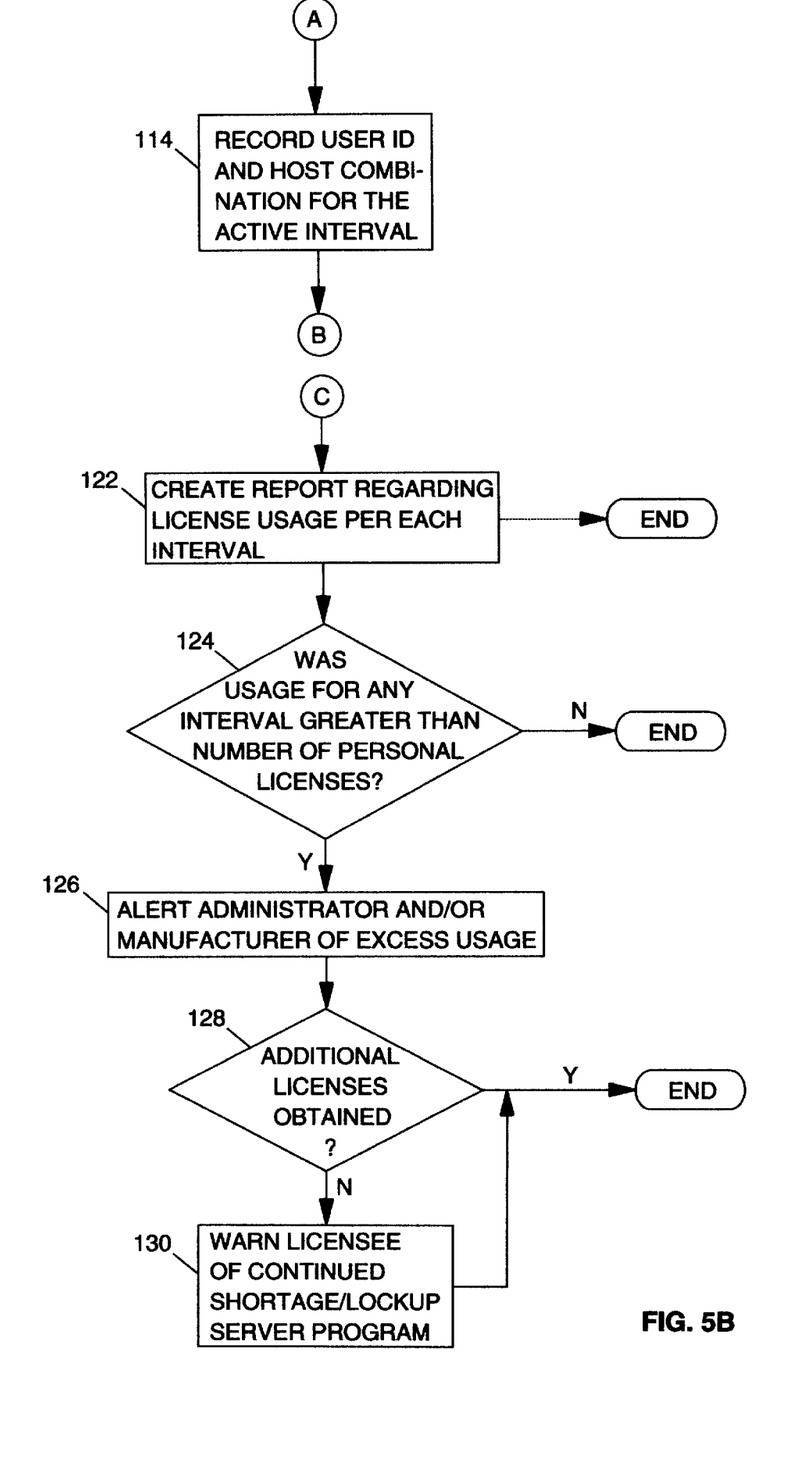

FIG. 5 is a flowchart which illustrates the logical steps utilized by the present invention to review an audit log for client license compliance. The present invention is embodied in a license monitoring routine 74 which is associated with the server program 64 (FIG. 3). While the server program 64 is running, the license monitoring routine 74 can be initiated upon the request of a person administering the client-server software (administrator), automatically and/or periodically at certain times, or by the software manufacturer via a network connection if permitted by the configuration. For purposes of clarity, the present invention will be described relative to an administrator.

Once the license monitoring routine 74 is determined to have been initiated (Step 100), the administrator may designate a certain time period for when the audit log 72 is to be reviewed and a usage interval into which the time period is to be divided, or may accept the default time period and interval (Step 102). For example, an administrator may designate that a review should cover a time period between 9:15 a.m. and 4:30 p.m. on Jun. 25, 1997 and that information should be gathered on each fifteen-minute interval during the time period. The time interval/time period approach is preferred when a concurrent licensing scheme is employed by the manufacturer. When the program is licensed on a per computer basis, and the relevant criteria is the total number of unique computers which access the server program, a broad time period, such as an entire day, would be more appropriate, and there would be no need to divide the period into intervals.

As per Step 104, the license monitoring routine 74 determines the start and end times for each interval based on the time period and interval length. For example, if the administrator designated that the review should cover the fifteen-minute intervals described in the paragraph above, the routine 74 determines that the first interval's start time should be 09:15:00 and the first interval's end time should be 09:29:59, the second interval's start time should be 09:30:00 and the second interval's end time should be 09:44:59, and so on.

As per Step 106, the license monitoring routine 74 reviews the audit log 72 to find the first entry that ended during the designated time period. Thus, if the time period covers from 09:15:00 to 16:29:59, the routine 74 searches for the first entry which represents a transaction that ended after 09:14:59 on the designated day. The routine 74 also initiates itself for the first time interval (activates the first time interval) so that a determination can be made as to whether the first entry represents a transaction which occurred (ended) during the first time interval and the data recorded appropriately, as discussed below.

Next, the license monitoring routine 74 reads the timestamp for the first entry (Step 108). The license monitoring routine 74 then determines whether the transaction ended during the interval being checked (Step 110). If the transaction ended during the interval being checked, the routine 74 determines whether the combination of user ID and client computer identifier for the entry have been recorded in an output file 76 for the interval being checked by reading the output file 76 relative to the active interval to determine if the combination has been recorded for the active interval (Step 112). The output file 76 can be an internal or external database associated with the server program 64. If the combination of user ID and computer identifier have been recorded relative to the active interval, the routine 74 ends processing relative to this entry and finds the next sequential entry in the audit log 72 (Step 116). If it is determined that the combination of user ID and computer identifier have not been recorded in the output file 76 relative to the active interval, the routine 74 records the user ID and computer identifier combination as a unique listing relative to the active interval in the output file 76 (Step 114). Processing then ends relative to the active entry, and proceeds to the next sequential entry in the audit log 72 (Step 116).

The next audit entry is read (Step 108), and it is determined in Step 110 whether the corresponding transaction ended during the active interval. If the license monitoring routine 74 determines that the entry's timestamp does not indicate that the transaction ended during the interval being checked, the routine 74 next determines whether any additional intervals within the designated time period remain to be checked (Step 118). If so, the routine 74 ends processing relative to the "active" interval, and makes the next sequential interval "active" (Step 120). Processing then returns to Step 110, and a determination is then made as to whether the end time for the active entry occurred during the newly active interval.

Processing of entries in the audit log 72 continues as described above until an entry having an end time that occurred after the end of the time period is finally read in Step 108. Step 110 will first determine that the end time did not occur during the active interval, and Step 118 will then determine that no additional intervals remain to be checked, and the reading of entries ends. The license monitoring routine 74 generates a report on the number of unique clients which were active during each interval utilizing the data stored in the data file 76 relative to each interval (Step 122). Each unique combination stored in the data file 76 for each interval represents a "count" for which the licensee should have a client license. The report can indicate whether the number for any period is greater than the number of client licenses. This report may be provided to the administrator and/or the software manufacturer, and either party can then take any steps necessary to bring the licensee into compliance, if appropriate, and processing may end. Alternatively, the invention provides for an automatic enforcement mechanism, if desired. In this case, the routine 74 needs to be programmed with the appropriate license information at installation. This data is dependent upon the type of manufacturer license (concurrent usage, user-based, machine-based, etc.).

As per Step 124, if the routine 74 determines that the number of users or client computers 68 transacting with the server program 64 is less than the number of client licenses, the routine 74 stops running; the licensee has purchased a sufficient number of licenses. However, if the number of client computers 68 exceeds the number of client licenses, the routine 74 informs the administrator or the software manufacturer that the number of licenses purchased is insufficient (Step 126). Preferably, the execution of the client-server software is not interrupted immediately. This prevents interruption of the licensee's business, and gives the licensee time to voluntarily comply with licensing requirements.

As per Step 128, the license monitoring routine 74 checks at a predetermined later date whether the customer purchased additional licenses to cover the discrepancy between the number of client licenses purchased and the number of users or client computers 68 transacting with the server program 64. Updating the routine 74 with a new client license number can be done in a number of ways. For example, the manufacturer can provide the licensee with instructions on how to update the routine 74, can provide code that the licensee may install into the server program 64, or can download an update to the routine 74 directly if an appropriate network connection exists. If it is determined in Step 128 that the license information has been updated, indicating that the customer has purchased a sufficient number of licenses, the routine 74 returns to an inactive state and processing relative to the initial license monitoring effort terminates. If it is determined that the license information in the routine 74 has not been changed, a number of options exist. The administrator can again be warned. This may be repeated a predetermined number of times until, finally, the routine 74 locks up the server program 64 until the requisite additional licenses have been purchased. This permits the licensee sufficient time to comply, and once again does not immediately interrupt the licensee. This also permits the licensee to know that a problem exists if an attempt was made to update the license information in the routine 74.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. Computer readible code stored on media for determining client usage in a client-server computing environment having a server program and at least one client program, comprising:

first subprocesses for establishing a time period for which to review an audit log of the server program for transaction entries;

second subprocesses for locating a first transaction entry recorded in the audit log for the time period and reading the first transaction entry;

third subprocesses for determining whether the first transaction entry represents usage of the server program by a unique client not already counted, and, if so, counting the first transaction entry;

fourth subprocesses for repeating said second and third subprocesses for each remaining transaction entry recorded in the audit log for the time period; and fifth subprocesses for generating a report regarding client usage during the time period.

2. Computer readible code for determining client usage according to claim 1, further comprising:

sixth subprocesses for determining whether the number of counted transaction entries is greater than a number of client licenses that a licensee has obtained for the client programs.

3. Computer readible code for determining client usage according to claim 1, wherein said first subprocesses further divides the time period into time intervals, said second subprocesses further determines the time interval during which each of the transaction entries was recorded, and said third subprocesses determines whether each of the transaction entries represents a unique client during the time interval during which the transaction entry was recorded, and if so, counting the transaction entry relative to the time interval during which the transaction entry was recorded.

4. Computer readible code for determining client usage according to claim 3, further comprising:

seventh subprocesses for generating a report regarding client usage during each of the time intervals of the time period.

5. Computer readible code for determining client usage according to claim 2, further comprising:

eighth subprocesses for alerting an administrator of the client-server computing environment that client usage is not in compliance with license terms if the number of counted transaction entries is determined to exceed the number of client licenses.

6. Computer readible code for determining client usage according to claim 2, further comprising:

ninth subprocesses for alerting a software manufacturer of the server program that the licensee is not in conformance with license terms if said fifth subprocesses determines that the number of counted transaction entries is greater than the number of client licenses.

7. Computer readible code for determining client usage according to claim 5, further comprising:

tenth subprocesses for determining whether the licensee has come into compliance with the license terms after passage of a predetermined amount of time, and, if not, preventing the server program from performing any additional client transactions until compliance has been achieved.

8. In a client-server computer environment including a server program operating on a server computer and a plurality of associated client programs operating on client computers, a method for determining whether a licensee of the client programs is in conformance with license terms regarding client program usage, comprising the steps of:

establishing a time period for which to review an audit log of the server program in which entries regarding client program transactions with the server program are recorded;

determining which entry in the audit log was the first entry which occurred in the time period;

reading the first entry;

determining whether the read entry represents usage of the server program by a unique client not already counted, and if so, counting the read entry;

repeating said reading and second determining steps for each remaining entry recorded for the time period; and alerting an administrator if the counted read entries exceed a number of client licenses.

9. A method for determining client usage according to claim 8, wherein said establishing step further divides the time period into time intervals, said reading step further determines the time interval during which the read transaction occurred, and said second determining step further determines whether the read transaction entry represents a unique usage during the time interval during which the transaction entry occurred, and if so, counting the transaction entry relative to the time interval during which the transaction entry occurred.

10. A system for determining a number of clients transacting with a server program in a client-server computing environment, said system comprising:

means for establishing first time period for which to review a log of transaction entries of a server program for client transactions with the server program;

means for locating an earliest transaction entry in the log which occurred during the time period;

means for reading the located transaction entry and determining whether the earliest transaction entry represents a usage of the server program by a unique client which has not already been counted, and, if so, counting the located transaction entry;

means locating each subsequent transaction entry which occurred during the time period and for repeating said reading and determining means relative to each said subsequent transaction entry; and means for generating a report regarding client usage.

11. A system for determining a number of clients transacting with a server program according to claim 10, wherein said reading means further comprises recording a user identification and client computer identification combination in a file for each transaction entry which represents a unique client which has not been counted and comparing the user identification and client computer identification combination to those already recorded in the file to determine whether the located transaction entry has been counted.

12. A system for determining a number of clients transacting with a server program according to claim 10, further comprising:

means for determining whether the number of counted transactions entries is greater than a number of client licenses purchased by a licensee, and, if so, alerting a manufacturer.

* * * * *